April 11, 1961 L. E. SODERQUIST 2,978,741
MECHANISM FOR HOLDING AND INFLATING TIRES AFTER VULCANIZATION
Filed July 5, 1957 7 Sheets-Sheet 1

INVENTOR.
LESLIE E. SODERQUIST
BY
ATTORNEYS

INVENTOR.
LESLIE E. SODERQUIST
BY Ely, Fryer Hamilton
ATTORNEYS

INVENTOR.
LESLIE E. SODERQUIST
BY Ely, Fryer Hamilton
ATTORNEYS

United States Patent Office 2,978,741
Patented Apr. 11, 1961

2,978,741

MECHANISM FOR HOLDING AND INFLATING TIRES AFTER VULCANIZATION

Leslie E. Soderquist, Silver Lake, Ohio, assignor to The McNeil Machine & Engineering Company, Akron, Ohio, a corporation of Ohio Filed July 5, 1957, Ser. No. 670,068

9 Claims. (Cl. 18—2)

This invention relates to the curing of pneumatic tires and particularly to a mechanism for use in the curing of tires having nylon plies or plies of similar synthetic filaments which shrink upon cooling after having been subjected to the heat of vulcanization. When taken out of the press or mold while still very hot, the nylon cords will shrink causing permanent distortion of the tire.

In the manufacture of tires, the carcasses of which are made of nylon, it has been the practice to cool the interior of the tire by flooding it with cooling water while it is still in the mold, which is one method of preventing distortion of the tire on removal from the mold or press. This method, however, when used with the modern press takes valuable curing time and cools off the equipment, thereby reducing the productive capacity of the curing press. Another method is to rim up the tire by hand and inflate it on a rim while the tire is still hot but before the cords have an opportunity to shrink. This procedure prevents distortion of the tire on cooling but it is a laborious and disagreeable operation.

One of the objects of the present invention is to create an apparatus which will be used in combination with a tire-curing press so that as the hot tire is discharged from the press after curing, and before it has an opportunity to cool to a critical point, the tire is automatically lifted from its support, rimmed up and inflated. The tire is held in this inflated condition for a period long enough to insure that it has cooled to the point where no shrinkage will occur. The tire is then released and the mechanism returned to position to take the next tire.

The press which forms a part of the preferred form of the invention may be one in which the tire is automatically discharged after cure; however, if no automatic unloading mechanism is present, the tire may be manually removed from the press and placed in position to be acted upon by the holding and inflating mechanism. The period of time required for vulcanization of a pneumatic automobile tire is now usually about twenty minutes, although this varies with individual tire manufacturers. This period gives ample time for the tire to cool to a temperature at which the nylon cords no longer tend to shrink.

In the mechanism shown and described herein the operation of the tire holding and inflating device is combined with the operation of the press so that, as the press starts to open at the end of the cure, the tire which had been previously cured in the press is discharged from the tire holder and the tire holder restored to the position to receive the tire which has just been cured.

In the present showing of the invention, the tire curing press is of the general type shown in several of applicant's prior patents. These presses are equipped with a toggle mechanism which is operated from large master gears at the sides of the press. The upper half of the mold is carried by this toggle mechanism and is moved upwardly and tilted backwardly at the end of the curing period. In the combination shown and described herein, the mechanism is constructed so that on the opening of the press the previously cured tire is discharged from the tire holding mechanism, which then stays in position to receive the freshly cured tire. When the press closes on an uncured tire the tire holding mechanism closes over the freshly cured tire, the tire is then inflated and stays inflated for a sufficient time so that it cools down below the danger point, whereupon the pressure is relieved, preferably at the time the curing cycle is finished and the press opens, again repeating the cycle.

Also, in the present showing of the invention, the press is equipped with automatic unloading devices such as shown in applicant's prior U.S. Patent No. 2,832,991 and No. 2,832,992, filed May 17, 1956.

An apparatus of the aforesaid applications is characterized by two stripping arms which are first raised to strip the tire from the diaphragm or other tire forming device, then one of the arms is raised above the other so that the cured tire will slide by gravity over the arms and out of the press. A gravity conveyor is located at the press, either at the front or rear, to receive the cured tire. The tire holding device is associated with the gravity conveyor and is designed to pick the tire up from the conveyor for rimming-up and inflating operations, and then to return the tire to the conveyor after the cooling period.

It will be understood that while we have illustrated, and will describe to the extent which may be necessary, a press of the type designed by applicant, and while we show a tire unloading device designed by the applicant, the details or specific mechanisms thereof are not important and other presses and other tire unloading devices may be used in the combinations set forth in the claims hereof. The press may be a single or multiple press. While there is illustrated one press unit only, it is understood that the mechanism will be duplicated for multiple presses. It will also be understood that details of the tire holding device which are set forth herein are shown as parts of the preferred embodiment of the invention and that changes, modifications and improvements may be made without altering the basically new features or aspects of the invention.

In the usual press installations the operations are controlled by standard timers which are well known in the art and need not be described or shown.

In the following figures, the best known and preferred embodiment of the invention is illustrated so as to enable the invention to be understood but the drawings and description are not to be taken as limiting the invention to the form thereof shown.

Fig. 1 is a side view of the press closed, it being understood that a tire is undergoing vulcanization therein. In this view the tire, which has just been cured in the press, is rimmed up and inflated. For convenience this tire, which is cooling off in the tire holding device, is designated as 1. In other views the tire which is being cured at the time shown in this view is designated as 2.

Fig. 2 is a side view of the press opened at the end of the cure. Tire No. 2 is raised out of the lower mold section but the stripping arms have not come into action. The cured tire holding device has opened up and tire No. 1, which has now been cooled down below the critical point, has been discharged.

In Fig. 3, tire No. 1 has moved off the press conveyor onto an off-bearing conveyor which may serve a battery of presses. Tire No. 2 has been raised by the stripping arms to the top of the diaphragm.

In␣Fig. 4 the stripping arms have been raised to their inclined position in which tire 2 now slides out of the press, and onto the press conveyor as shown in dotted and full lines. This tire is now positioned to be rimmed-up on the tire holding device when it reaches the position shown in full lines.

In Fig. 5, tire No. 2 has been picked up by the lower plate or ring of the tire holding device and is being carried to the upper plate. The press is now closing around the next or No. 3 tire, which is uncured at this time.

Fig. 9 is a view looking down on the section of the press conveyor where the lower tire plate is located, the view being taken along line 9—9 of Fig. 4.

*The curing press and conveyors*

Figure 1:
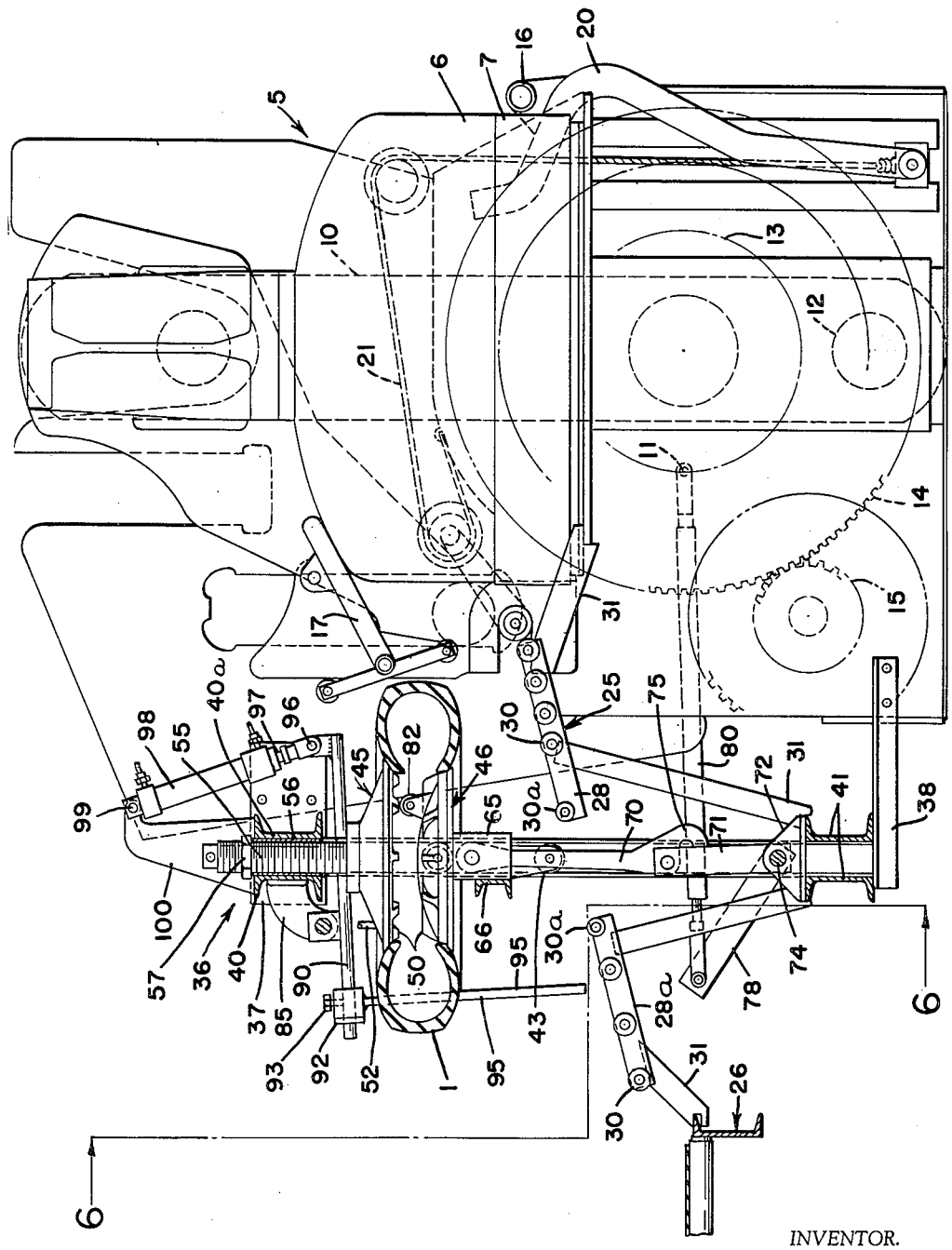

In the drawings the curing press as a whole is indicated at 5, the upper mold being 6, the lower mold 7, and the diaphragm or other tire-shaping device 8. One of the toggle links by which the upper mold section is raised or lowered is indicated at 10, the lower end thereof being journaled at 12 on a large gear 14. This gear is driven by a spur gear 15 from the motor of the press and the operation of the press is controlled by a standard timer which automatically opens the press at the end of the curing cycle in accordance with standard practice. These elements are not shown as they are well known in this art. On the gear 14 is a pivot pin 11, the orbit of which is indicated at 13, this being the point of attachment for the mechanism which operates the tire holder.

Figure 3:
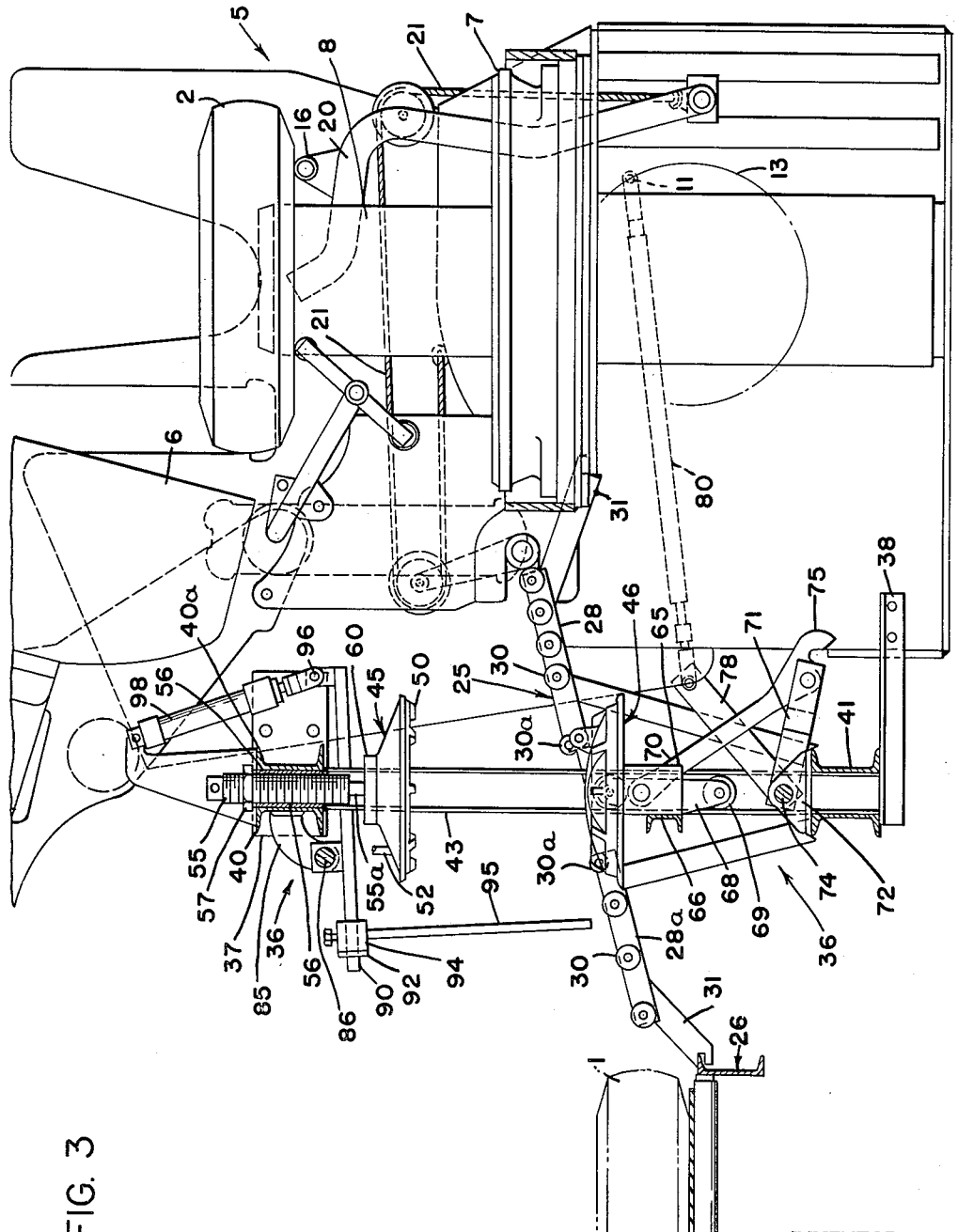
Figure 4:
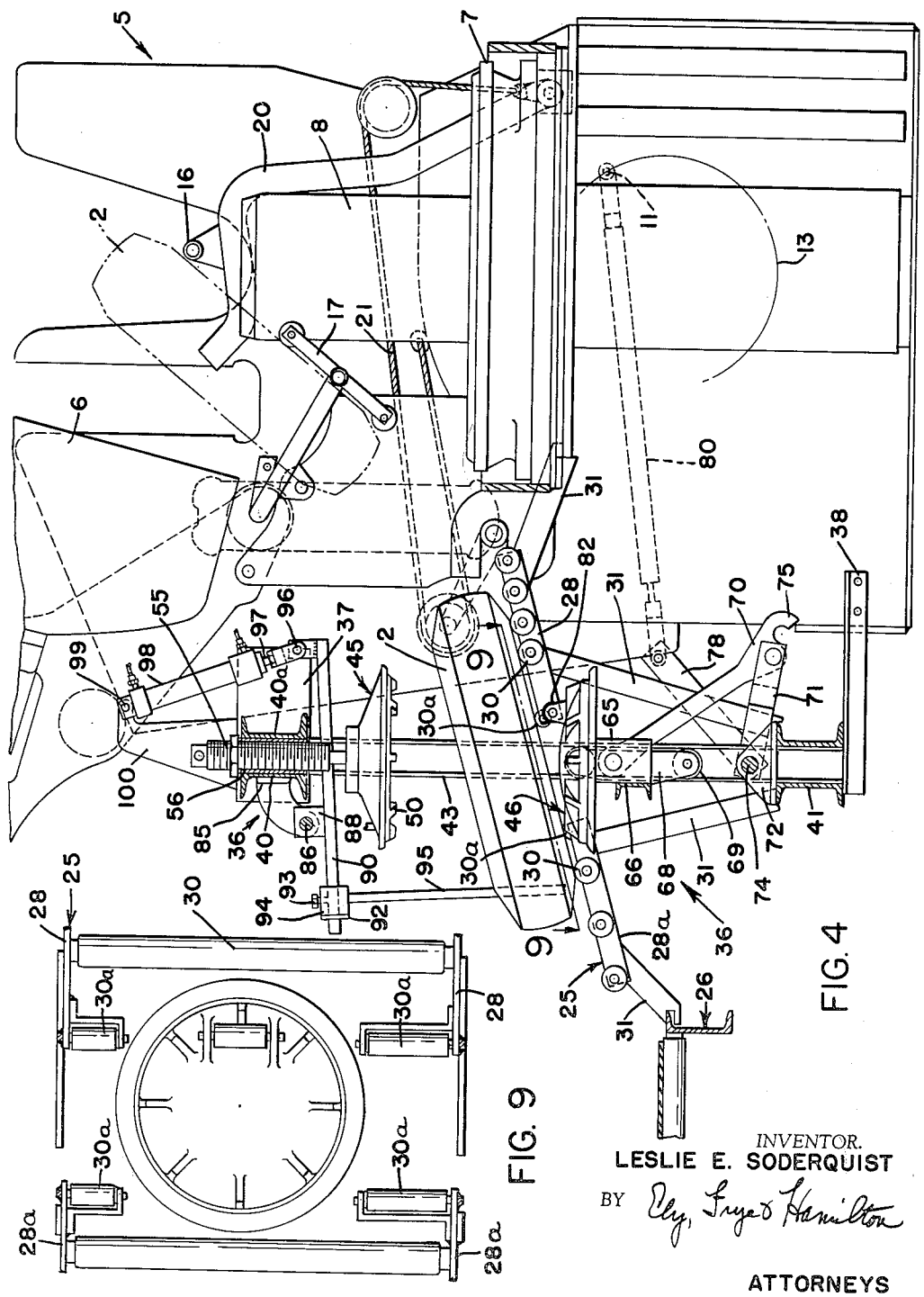
Figure 5:
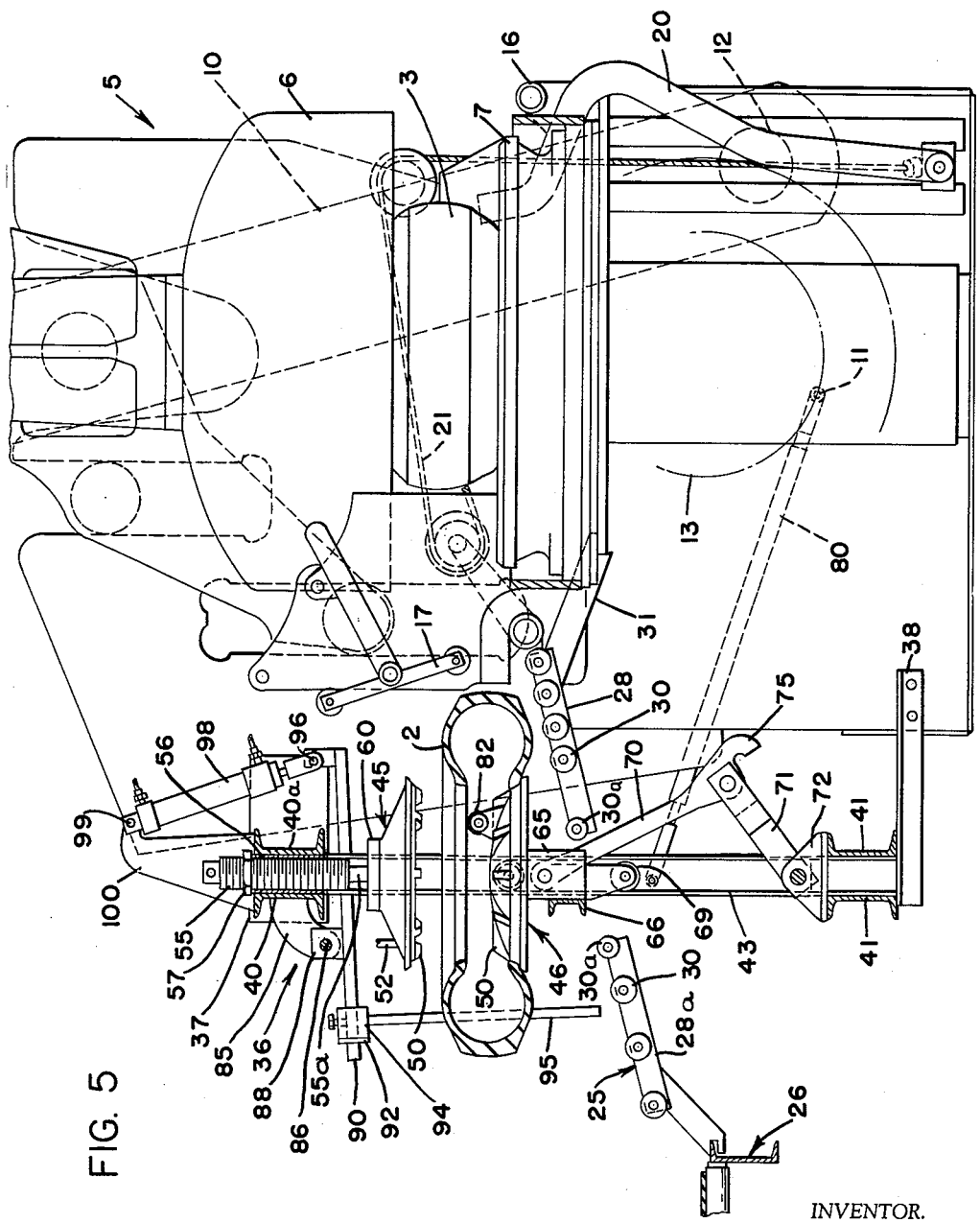

The device shown for raising the cured tire along the diaphragm and then for tilting it so that it passes out of the press by gravity is that shown in detail in aforesaid Patent No. 2,832,992. Generally, it comprises a forward stripping arm 16 and a rearward stripping arm 17. The arm 16 is mounted on cam rails 20 which are raised and lowered by cables 21, as described in the aforesaid application. The arm 16 moves upwardly along the tire forming mechanism and then over and across it, as shown in Figs. 3 and 4. The arm 17 rocks from the position shown in Fig. 1 to the position shown in Fig. 3, where it remains during the latter part of movement of the arm 16 and thereby forms a support for the tire as it moves out of the press. After the tire leaves the press, the arms 16 and 17 are returned to their inactive positions shown in Fig. 1.

The support table for the cured tire is preferably a gravity conveyor 25, which receives the tire from the unloading devices and eventually delivers it to the off-bearing conveyor 26. In the form shown herein, the conveyors are located at the rear of the press as this is more convenient. The unloaders may deliver the cured tire to the front of the press, if desired, in which case the conveyors will be correspondingly relocated.

The conveyor 25 is composed of pairs of parallel side rails 28 and 28a across which are located tire-supporting rollers 30. The rails are supported from the press and from other stationary parts by members 31. There is a substantial transverse passage or opening between the two sections of the press conveyor as shown in the several views and at this point the tire-holding and inflating mechanism is located. Small supplemental rollers 30a may be located on either side of the gap, as shown more particularly in Fig. 9.

*The tire holder and inflation mechanism*

The tire holder and inflation unit is indicated as a whole by 36. It is supported from the frame of the press by upper plates 37 and lower arms 38. Fixed to the plates 37 and extending across the press conveyor are two parallel channel beams 40 and 40a and across the plates 38 are two lower channel beams 41. Secured to the channel beams 40, 40a and 41 are two upright spaced channels 43 and 43a which complete the framework of the holder and face each other to form guides for the lower movable plate.

Figure 7:
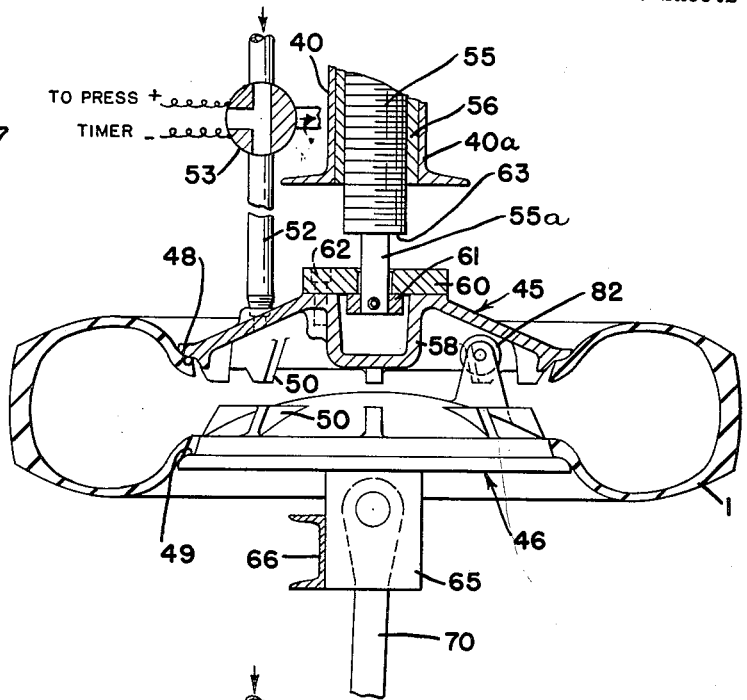
Fig. 7 is a cross section through the holder or tire rimming-up device at the end of the upward movement of the lower plate, and before inflation.
Figure 8:
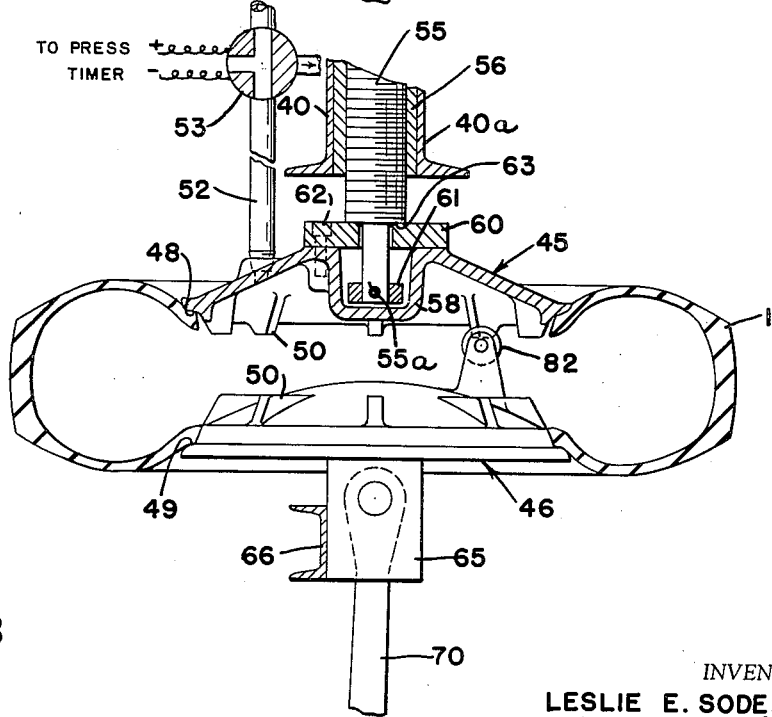
Fig. 8 is a similar view but showing the tire in inflated condition which is the cross-sectional view of the tire in its normal condition.

The upper and lower plates or closures between which the tire is held during the inflating and cooling period are indicated at 45 and 46, respectively, and are shown in greater detail in Figs. 7 and 8. Both plates are closed in to retain air in the tire and each is provided with an annular seat 48 or 49, respectively, which engage and make airtight seals with the beads of the tire. Each closure or plate is provided with radial ribs 50 on their opposing faces which are inclined at their outer ends to assist in guiding the tire beads to their seats 48 and 49. In either plate, here shown as the plate 45, is located in inflating conduit 52, through which air is injected between the plates and into the tire. The pressure on the air line is usually about fifty lbs. although this may vary with the tire. At some point in the line to the conduit 52 is a valve, indicated diagrammatically at 53, which is operated by the press timing mechanism which controls the admission or withdrawal of the curing medium from the tire. The valve 53 is of any standard type which will permit the admission and withdrawal of air pressure to the tire, while it is held by the plates 45 and 46.

The upper plate 45 is carried on the lower end of a shaft 55 which is threaded in a sleeve 56 located between the channels 40. The shaft may be rotated to adjust the position of the plate 45 for different sizes widthwise of tires and is held in its adjusted place by a lock nut 57. The lower end of shaft 55 is reduced and extends into a recess 58 in the plate 45. Over the reduced shaft is a disk 60 which is supported by a ring 61 pinned to the end of the shaft. The plate 45 is attached to the disk 60 at 62.

It will be noted that there is considerable space between the ring 61 and the threaded portion of the shaft 55, which allows for a limited movement of the plate 45. This movement of the plate 45 on the reduced end 55a of the shaft occurs after the tire is in contact with the two plates and is limited by the shoulder 63. Under the force exerted by the inflating pressure, the plate will rise from the position shown in Fig. 7, which illustrates the condition of the tire when it is first held by the plates, and the position shown in Fig. 8, where the tire is inflated and in which condition the tire is maintained during the balance of the cooling period.

To the underside of the lower plate are attached two spaced lugs 65 which are welded to a transverse beam 66 that forms the carriage for the lower plate. At the points where the beam 66 crosses the uprights 43 and 43a there are attached bogies 68, on the ends of which are mounted rollers 69 traveling in the channels 43 and 43a and serving to guide the plate 46 in its movements to and from the upper plate 45.

Figure 6:
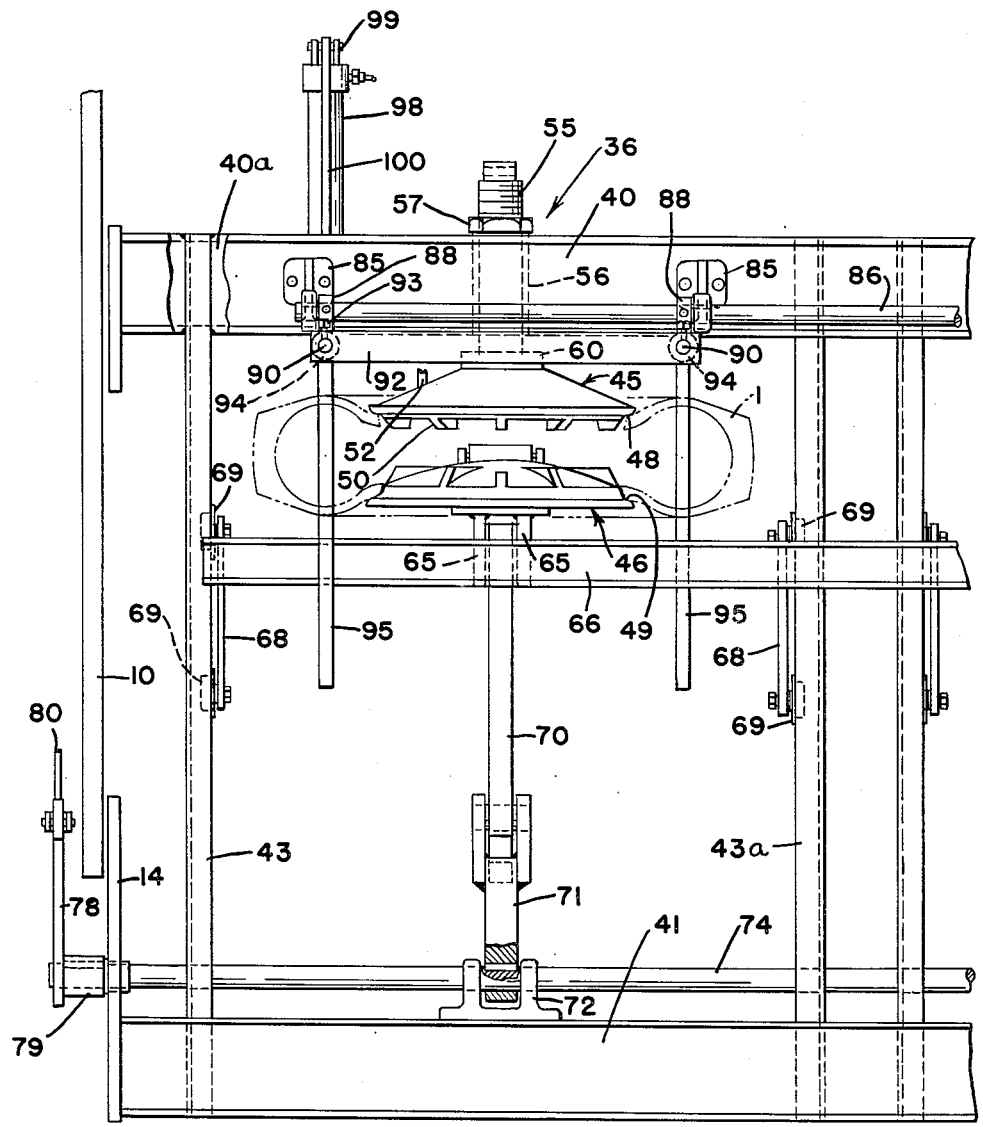
Fig. 6 is an end view, the location of which is indicated by the line 6—6 of Fig. 1.

Pivoted at its upper end to the lugs 65 is the upper member 70 of a toggle, the other member of which is the link 71 which is keyed to a shaft 74 pivoted in a plate 72 located across the channels 41. The shaft 74 may be extended to a second vulcanizing unit as shown in Fig. 6. At the lower end of the link 70 is a hook-like extension 75 which will strike the link 71 when the toggle is straightened out at the end of the raising movement. It is desirable to have the toggle go slightly past center at the end of its stroke to hold the lower plate 46 in its raised position against the force of the inflating air.

The toggle is operated by means of a crank arm 78 which is attached to the sleeve 79 which is keyed to the end of the shaft 74. The upper end of the crank arm is pivoted to an adjustable link 80 which is pivoted at its other end at the pin 11 on the press operating gear 14.

It will be noted from Fig. 1 that the point of connection between the link 80 and the gear 14 is so located that when the press is closed the toggle 70—71 is straightened and the plate 46 is raised to its uppermost position immediately below the plate 45. It is during the period that the press remains closed that one tire is undergoing vulcanization in the press and another tire is cooling off in the tire holder and inflator. The period during which the press is closed is determined by the press timer.

Figure 2:
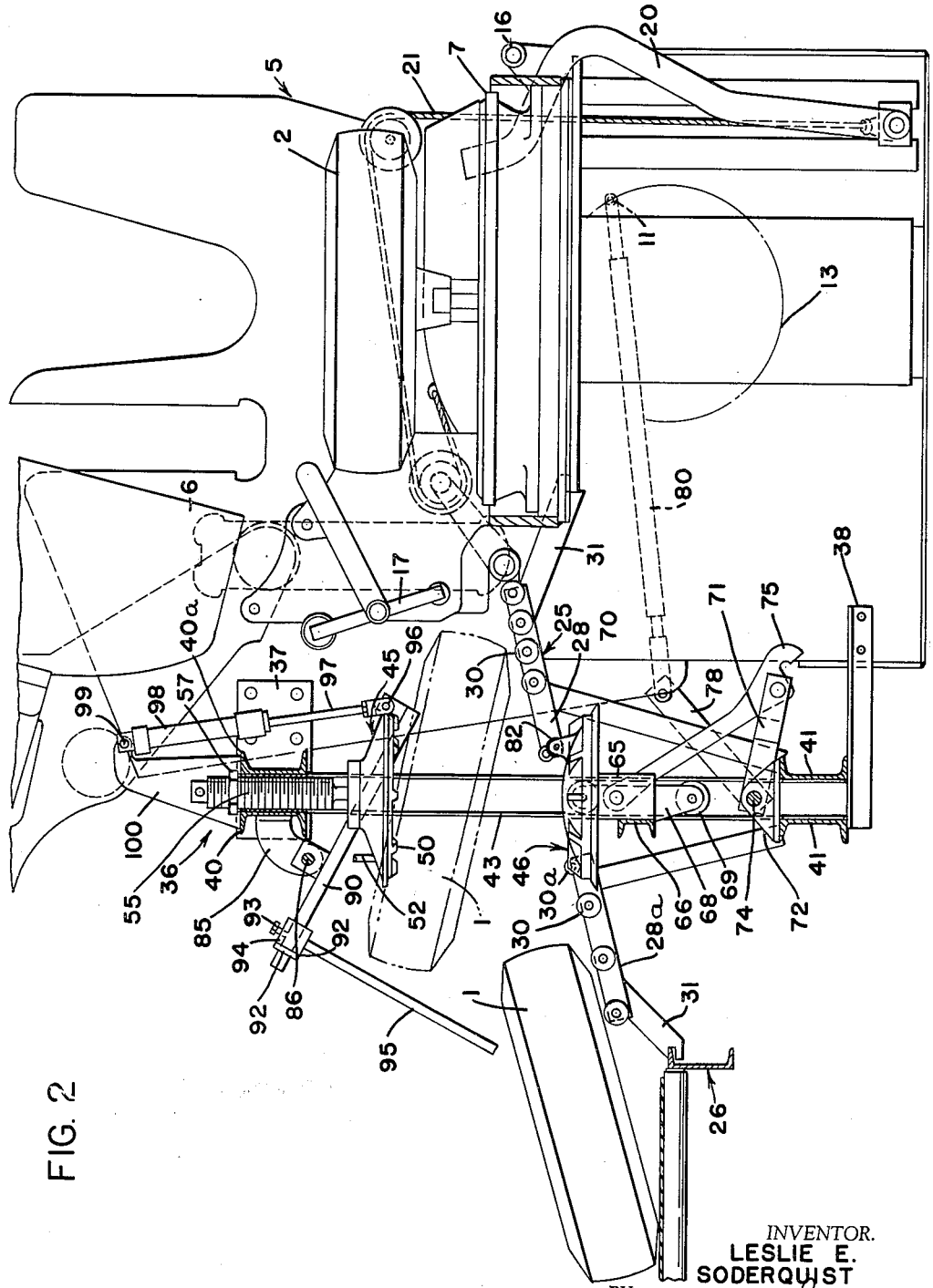

When the vulcanizing period is over, the press opens automatically and the rotation of the gear 14 moves the point 11 to the right in Fig. 2. This action breaks the toggle 70—71 and the lower plate returns to its lowered position, passing between the two sections of the press conveyor and slightly below the plane thereof. It will be seen that a supplemental roller 82 is located on the upper side of the plate 46 nearest the press, the purpose of which is to support the forward portion of the tire as it moves over the plate and prevent it from dropping into the space between the conveyor sections.

Normally, when the plate 46 moves downwardly, the tire goes with it and is stripped from the plate as it passes below the level of the conveyor. To facilitate this action the bead seat 49 on the lower plate may be machined to have a closer fit on the bead than the seat 48, as shown in Figs. 7 and 8.

On the outer face of the beam 40 at each unit of a dual press are mounted two spaced angular brackets 85, in the outer ends of which is a shaft 86. Over the shaft 86 are rotatable sleeves 88, to the underside of which are attached two parallel bars 90 which extends to either side of the center line of the tire holding unit. Across the outer ends of the bars 90 is a long plate 92 held in adjusted position by set screws 93 in sleeves 94 attached to the plate. From the sleeves 94 depend long rods 95 which, when bars 90 are substantially horizontal, project in the path of the tire which is moving down the press conveyor and arrest it when it is in register with the lower plate 46. As shown in Fig. 6, the rods 95 are located at opposite sides of the conveyor in position so as to contact the tire in such a manner that they will normally center the tire in both directions over the plate 46. Any off-center position of the tire will be rectified by the ribs 50 on the plates 46 and again by the ribs 50 on the plate 45.

It is essential that the rods 95 be moved away from the path of the tire when it is discharged from the tire holder and for this purpose one of the bars 90 is pivoted at 96 to the end of a piston rod 97 operated by the cylinder 98, the upper end of which is pivoted at 99 to a bracket 100 attached to the beams 40—40a.

Cylinder 98 is a double-acting cylinder and pressure is applied to either end thereof by valves not shown operated by limit switches on the press so that when the press is closed the piston is withdrawn, as in Fig. 1, which locates the rods 95 in the path of the oncoming tire. When the press opens at the end of the cure, pressure is admitted to the upper end of the cylinder which rocks the bars 90 raising the rods out of the path of the tire. This operation is timed to occur after the press opens, but before the tire 2, which is in the press, has been unloaded by the stripping arms. This condition is shown in Fig. 2.

There is a sufficient interval to allow the tire 1 to pass off the press conveyor before the tire 2 starts to unload and during this interval pressure is introduced into the lower end of cylinder 98 and the bars 90 resume their horizontal position with the rods 95 in place to stop the oncoming tire 2.

Should the tire in the cooling unit stick to the upper plate 45, the inner ends of the bars 90 are projected to a point where they will strike the tire when the rods 95 are raised and forcibly strip it from the plate 45. This situation is illustrated by the dotted line showing of the tire 1 in Fig. 2.

When the tire is lifted by the lower plate 46, the upper tire bead will mate with the seat 48 just before the plate reaches its upper limit. The weight of the upper plate will cause the two beads to approach as the plate 46 finishes its upward movement. This causes the beads to seat firmly in the two plates and make an airtight seal, and at this time the inflating air is admitted through the conduit 52. The opening of the valve 53 to admit air to the tire and then to deflate the tire at the end of the cooling period is done in timed relation to the admission and withdrawal of curing pressure from the tire and therefore may be controlled by the press timer which controls the admission of pressure to the tire in the press. At the end of the cure, before the plate 46 is lowered by the opening of the press and the breaking of the toggle, the timer will actuate the valve 53 to exhaust pressure from between the plates 45 and 46.

It is not desirable to cool the tire while in the condition shown in Fig. 7, and therefore the floating mounting for the upper plate 45 is provided. The pressure of the air overcomes the weight of the plate 45, and as the tire expands the plate 45 is raised to the position shown in Fig. 8, in which condition the tire remains during the cooling period.

It will be seen that by compressing the beads an effective air seal is first provided at the beads for the start of the inflation, but that provision is made to cool off the tire while in its normal operative condition.

It will be noted that during the cooling period the tread and side walls of the tire are free and out of contact with any support or element which would prevent the tire from assuming and holding its fully rounded shape during the cooling period. The tire has been lifted off the conveyor and, due to the inclined position of the rods 95, is out of contact with those elements, being held solely by the inextensible beaded edges of the tire. If the side or tread of the tire at this time rested upon the conveyor 30 or against the rods 95, the weight of the tire and the presence of any of those elements against the expansible portion of the tire might prevent the hot tire from completely rounding out while it is inflated and being chilled below the critical temperature of nylon cords.

Résumé

It is believed that the operation of the mechanism will be understood from the foregoing. The device is adapted for the maximum efficiency in the curing of tires which, due to the nature of the cords, will distort on cooling unless measures are taken to hold the tire during the cooling-off period in the condition in which is is when in service.

The invention is especially effective but not limited to cases where the press is provided with a diaphragm or automatic unloading devices because the operation of the mechanism may be regulated to take a cured tire before it cools appreciably, rim it up, inflate and hold it in inflated condition for a sufficient period and then deflate the tire and release it in time to receive another tire. The inflation and deflation of the tire is operated in timed relation to the curing cycle of the press because the valve mechanism is controlled by the same timing mechanism which controls the passage of the curing medium to and from the tire. No loss of production is occasioned by holding the cooling tire during the whole of the curing period and then releasing it just before the second tire is about to pass out of the press.

So far as known to the applicant, this is the first mechanism to perform the functions set forth and as such the claims are entitled to a liberal construction and interpretation.

What is claimed is:

1. Mechanism for holding and inflating tires during a cooling period following vulcanization comprising a support for the cured tire, independently movable upper and lower plates located on opposite sides of the support, each plate having a seat for a tire bead, a passage for the lower plate through the support, means for raising the lower plate through the passage and toward the upper plate, means to locate the tire in register with the seats, and means to inflate the tire when the plates are closed together against the beads.

2. In a tire press for shaping and curing unvulcanized tire bands within separable mold sections, a conveyor to receive a cured tire from said press, closures located along said conveyor, an opening through said conveyor for at least one of said closures, a stop to locate a cured tire on said conveyor in register with said closures, means to clamp said tire between said closures above said conveyor, an inflator operable after contact of the closures with the tire to inflate the tire, and means operable after a cooling period to deflate and release the tire from the closures.

3. In a tire press for shaping and curing unvulcanized tire bands within mold sections separable by press operating means, said press being adapted to discharge a cured tire, a conveyor adjacent a mold section to receive a discharged tire, closures located along said conveyor, an opening through said conveyor for at least one of said closures, a stop to locate a cured tire on said conveyor in register with said closures, means actuated by said press operating means to clamp the tire between the closures above said conveyor, an inflator operable after contact of the closures with the tire to inflate the tire, and means operable after a cooling period to deflate and release the tire from the closures.

4. In a tire press for shaping and curing unvulcanized tires within separable mold sections, said press being adapted when open to discharge a cured tire, a conveyor adjacent a mold section to receive a discharged tire, a plate below and a plate above said conveyor, each of said plates having bead seats which engage the beads of a cured tire to form airtight seals therewith, a passage through said conveyor for said lower plate, a stop to locate a cured tire on said conveyor in register with said plates, means actuated by closing of the press to lift said lower plate above said conveyor and carry the tire therewith toward said upper plate, and means to inflate the tire thereafter.

5. In a tire press for shaping and curing unvulcanized tires within separable mold sections, said press being adapted when open to discharge a cured tire, a conveyor adjacent a mold section to receive a discharged tire, a plate below and a plate above said conveyor, each of said plates having bead seats which engage the beads of a cured tire to form airtight seals therewith, a passage through said conveyor for said lower plate, a stop to locate a cured tire on said conveyor in register with said plates, means actuated by closing of the press to lift said lower plate above said conveyor and carry the tire therewith toward said upper plate, means to inflate the tire thereafter, and means to deflate the tire and open the plates and discharge the tire after a cooling period onto said conveyor.

6. In a tire press for shaping and curing unvulcanized tires within separable mold sections, said press being adapted when open to discharge a cured tire, a conveyor adjacent a mold section to receive a discharged tire, a plate below and a plate above said conveyor, each of said plates having bead seats which engage the beads of a cured tire to form airtight seals therewith, a passage through said conveyor for said lower plate, a stop to locate a cured tire on said conveyor in register with said plates, means actuated by closing of the press to lift said lower plate above said conveyor and carry the tire therewith toward said upper plate, means to inflate the tire thereafter, and means actuated by opening of the press to separate the plates and drop said lower plate below said conveyor.

7. Apparatus for holding and inflating tires during a cooling period following vulcanization, comprising, a support for a hot tire, independently movable closures located on opposite sides of the support, said closures having bead seats to engage and make airtight seals with the beads of said tire, a passage for at least one of said closures transverse the plane of said support, means to cause the closures to approach while said tire is on said support and located between the closures, and means to lift the closures free of said support and to inflate the tire when said bead seats are in contact with the tire.

8. Apparatus for holding and inflating tires during a cooling period following vulcanization comprising, a support for a hot tire, a passage transverse the plane of said support, upper and lower closures on opposite sides of said support passage, each of said closures having a seat for a tire bead, means to locate the tire in register with said closures, means to move said lower closure through said passage when a tire is aligned therewith and elevate said tire above said support, a yielding mounting for said upper closure, and means to inflate the elevated tire when said closure seats are engaging the tire beads, said upper closure moving a predetermined distance away from said lower closure during said inflation.

9. Apparatus for holding and inflating tires during a cooling period following vulcanization comprising, a support for a hot tire, a passage transverse the plane of said support, upper and lower closures on opposite sides of said support passage, each of said closures having a seat for a tire bead, positioning means contacting the tread of a tire on said support to hold the beads of a tire in alignment with said closures, means to move said lower closure through said passage when a tire is aligned therewith and elevate said tire above said support, and means to inflate the elevated tire when said closure seats are engaging the tire beads.

References Cited in the file of this patent

UNITED STATES PATENTS

| | | |
|---|---|---|
| 1,979,552 | Hulslander | Nov. 6, 1934 |
| 1,986,092 | Abbott | Jan. 1, 1935 |
| 2,045,937 | Woock | June 30, 1936 |
| 2,104,673 | Reiser | Jan. 4, 1938 |
| 2,443,955 | Gizik | June 22, 1948 |
| 2,672,651 | Smyser | Mar. 23, 1954 |
| 2,697,853 | Smyser | Dec. 28, 1954 |
| 2,734,225 | Glynn | Feb. 14, 1956 |
| 2,826,783 | Robbins | Mar. 18, 1958 |
| 2,835,921 | White | May 27, 1958 |

FOREIGN PATENTS

| | | |
|---|---|---|
| 1580/56 | Union of South Africa | Nov. 29, 1955 |

UNITED STATES PATENT OFFICE
CERTIFICATE OF CORRECTION

Patent No. 2,978,741                                    April 11, 1961

Leslie E. Soderquist

It is hereby certified that error appears in the above numbered patent requiring correction and that the said Letters Patent should read as corrected below.

Column 2, line 13, strike out ", filed May 17, 1956"; column 4, line 13, for "in" read -- the --; column 8, line 50, for "Reiser" read -- Rieser --; line 51, for "Gizik" read -- Guzik --.

Signed and sealed this 19th day of December 1961.

(SEAL)
Attest:

ERNEST W. SWIDER
Attesting Officer

DAVID L. LADD
Commissioner of Patents

USCOMM-DC